United States Patent [19]

Cunningham

[11] Patent Number: 5,045,030

[45] Date of Patent: Sep. 3, 1991

[54] GUIDE AND TENSIONING DEVICE FOR ENDLESS TRACK VEHICLES

[76] Inventor: Kelly G. Cunningham, P.O. Box 7146, Charleston, W. Va. 25356

[21] Appl. No.: 537,959

[22] Filed: Jun. 13, 1990

[51] Int. Cl.⁵ ............................................. F16H 7/12
[52] U.S. Cl. ................................. 474/138; 474/901; 474/164
[58] Field of Search ............................. 474/136–138, 474/163–165, 901

[56] References Cited

U.S. PATENT DOCUMENTS

| | | | |
|---|---|---|---|
| 1,514,158 | 11/1924 | Holt | 474/138 |
| 1,674,817 | 6/1928 | Best | 474/901 |
| 2,238,347 | 4/1941 | Starr et al. | 474/165 |
| 2,284,821 | 6/1942 | Heaslet | 474/138 |
| 2,599,233 | 6/1952 | Christie | 474/164 |
| 3,007,745 | 11/1961 | Even | 474/901 |
| 3,093,006 | 6/1963 | Gamaunt | 474/901 |
| 3,603,650 | 9/1971 | Miller | 474/901 |

Primary Examiner—Ramon S. Britts
Assistant Examiner—Roger J. Schoeppel
Attorney, Agent, or Firm—Sughrue, Mion, Zinn, Macpeak & Seas

[57] ABSTRACT

An endless track assembly for a vehicle includes a support plate having an elongated, horizontal guide slot formed in one end thereof. A support is slidably mounted in a guide groove and an idler sprocket is rotatably mounted on a support. The drive sprocket is rotatably mounted at the other end of the support plate and an endless track is entrained about the two sprockets. A spring is mounted between an abutment on the movable support member and an adjustable abutment member which is secured to the side of the support plate between the two sprockets. A chamber containing pressurized grease is disposed in engagement with the movable abutment to vary the position thereof to vary the force of the spring acting on the idler sprocket to in turn vary the tension of the endless track. A plurality of guide rollers are rotatably mounted in engagement with the endless track on the same side of the support member as the sprockets. The guide rollers are rotatably supported on the stub shafts which are mounted in cantilever fashion on the support plate and extend outwardly from said support plate on only one side thereof.

2 Claims, 1 Drawing Sheet

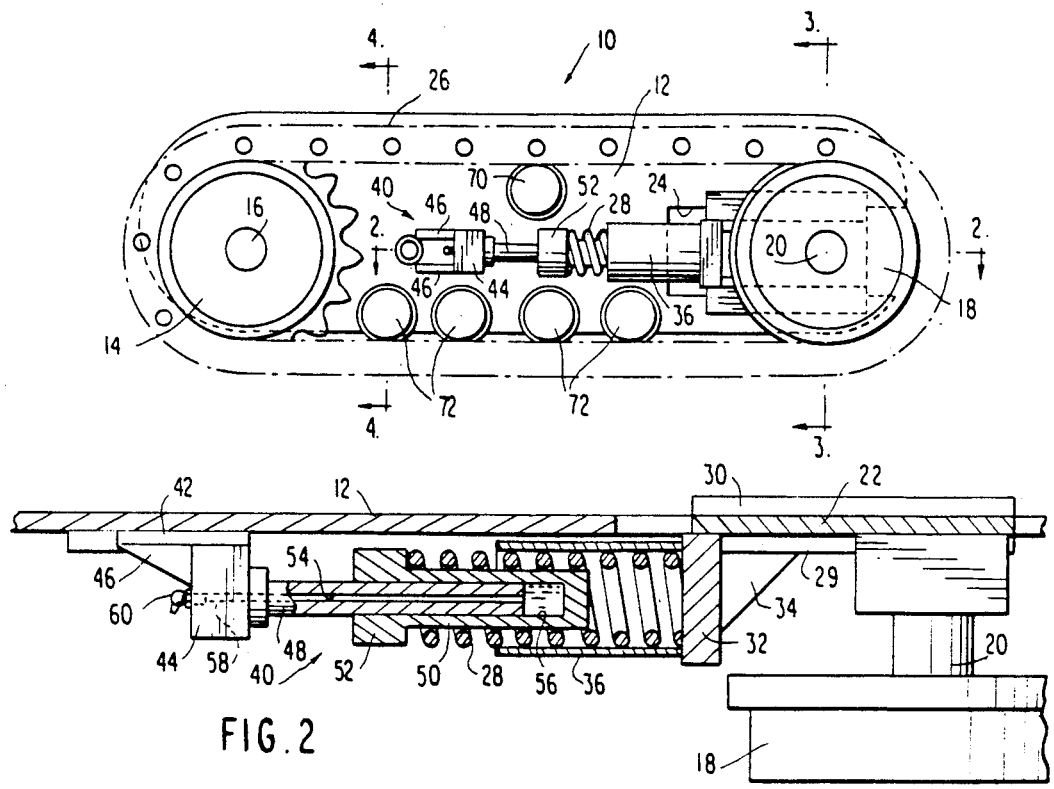
FIG. 1
FIG. 2
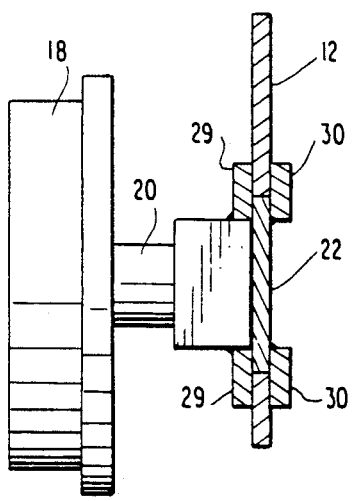
FIG. 3
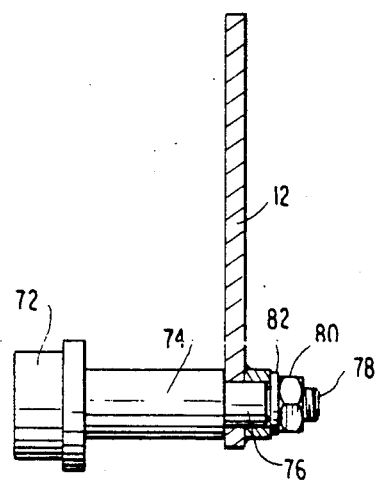
FIG. 4

GUIDE AND TENSIONING DEVICE FOR ENDLESS TRACK VEHICLES

BACKGROUND OF THE INVENTION

The present invention is directed to a guide and tensioning device for endless track vehicles and more specifically to an adjustable spring-biased support plate for a sprocket over which an endless track is entrained.

In endless track vehicles of the type used for off the road construction equipment such as bulldozers and the like, each endless track is usually entrained about a pair of large diameter sprockets with one of the sprockets being a drive sprocket and the other sprocket being an idler sprocket. The sprockets are generally mounted for rotation on an elongated support assembly secured to the body of the vehicle and extending along a side thereof. In order to properly tension the endless track about the sprockets, the idler sprocket is usually provided with some type of adjustment relative to the support plate. However, such an adjustment of the sprocket relative to the support assembly is generally difficult to accomplish and involves raising the vehicle so as to remove all weight from the endless track and sprockets. Furthermore, such adjustment arrangements are generally designed to rigidly secure the idler sprocket to the support assembly at the desired distance from the drive sprocket.

In addition to providing support for the drive sprocket and the idler sprocket, the support assembly also is used to support a plurality of idler rollers intermediate the sprockets to prevent the endless track from being forced upwardly between the sprockets as the vehicle passes over rough and uneven terrain and to prevent sagging of the endless track between the sprockets due to the weight of the track. Such idler rollers are generally mounted on shafts which extend through the support assembly with guide rollers mounted on opposite sides of the support assembly. Such an arrangement however, results in a wider support assembly for the endless track thereby unduly increasing the overall width of the endless track vehicle.

SUMMARY OF THE INVENTION

The present invention provides a new and improved guide and tensioning device for endless track vehicles which overcomes the problems noted above with respect to prior art constructions.

The present invention provides a new and improved guide device for endless track vehicles comprising a flat, elongated, vertically disposed support plate adapted to be mounted along each side of a vehicle, a pair of sprockets rotatably mounted adjacent opposite ends of said plate with an endless track entrained thereabout and a plurality of guide rollers rotatably supported on said plate for engaging and supporting said endless track intermediate said sprockets wherein support means are provided for each guide roller comprising a stub shaft secured to said plate and extending perpendicular thereto on one side thereof and means for rotatably supporting a guide roller on said stub shaft.

The present invention provides a new and improved tensioning device for endless track vehicles comprising a flat, elongated, vertically disposed plate adapted to be mounted on each side of a vehicle, a drive sprocket rotatably supported at one end of said plate, an idler sprocket disposed adjacent an opposite end of said plate, adjustable mounting means for said idler sprocket and an endless track entrained about said drive sprocket and said idler sprocket, said adjustable mounting means comprising a horizontally disposed slot extending inwardly from said opposite end of said plate, a support plate slidably mounted in said slot for movement along said slot, means for rotatably supporting said idler sprocket on said support plate, adjustable spring support means secured to one side of said plate between said drive sprocket and said idler sprocket and spring means disposed between said spring support means and said support plate for biasing said support plate towards said opposite end to move said idler sprocket away from said drive sprocket to tension said endless track.

The foregoing and other objects, features and advantages of the invention will be apparent from the following more particular description of a preferred embodiment of the invention as illustrated in the accompanying drawings.

BRIEF DESCRIPTION OF THE DRAWINGS

FIG. 1 is a side elevation view of an endless track assembly showing the guide and tensioning devices for the endless track according to the present invention.

FIG. 2 is a sectional view taken along the line 2—2 of FIG. 1.

FIG. 3 is a sectional view taken along the line 3—3 of FIG. 1.

FIG. 4 is a sectional view taken along the line 4—4 of FIG. 1.

DETAILED DESCRIPTION OF THE INVENTION

The track assembly 10 as shown in FIG. 1 is comprised of a flat, elongated, vertically disposed support plate 12 adapted to be secured to each side of a vehicle. A drive sprocket 14 is secured to a shaft 16 which is rotatably mounted on the plate 12 and adapted to be driven by suitable drive means mounted on the vehicle (not shown). An idler sprocket 18 is rotatably mounted on a shaft 20 which is secured to a support plate 22 mounted for sliding movement longitudinally of an elongated horizontal slot 24 extending inwardly from the end of the plate 12. An endless track 26 is entrained about the drive sprocket 14 and the idler sprocket 18.

In order to properly tension the endless track 26 about the sprockets 14 and 18, a spring 28 is provided for normally biasing the support plate 22 upon which the idler sprocket 18 is rotatably mounted in a direction away from the drive sprocket 14 which is rotatable about a fixed axis on a support plate 12. Two pairs of guide plates 28 and 30 are welded to opposite sides of the top and bottom edges respectively of the support plate 22 to define a pair of U-shaped channels which engage the top and bottom edges of the slot 24 in the support plate 12. An abutment plate 32 and a triangular support bracket 34 are welded to each other and the support plate 22 between the top and bottom pairs of guide plates 28 and 30. A tubular spring guide 36 is welded to one face of the abutment plate 32 and extends toward the drive sprocket 14.

An adjustable abutment assembly 40 is secured to the support plate 12 adjacent the rotatable drive sprocket 14. The adjustable abutment assembly is comprised of a base plate 42 secured to the support plate 12 by any suitable means such as welding or the like. A stationary abutment block 44 is secured to the base plate by welding or the like and a pair of triangular gussets 46 are welded between the base plate and the abutment block to provide added strength. The guide rod 48 is welded at one end to the support block 44 and extends toward the abutment plate 32 on the movable support plate 22. The hollow, tubular sleeve 50 is slidably mounted on the rod 48 and is provided with an abutment flange 52. The compression spring 51 extends over the tubular sleeve 50 and is disposed in engagement with the abutment flange 52. The rod 48 is provided with a longitudinally extending bore 54 which is in communication at one end with a chamber 56 formed between the sleeve 50 and the rod 48. The opposite end of the bore 54 communicates with a second bore 58 extending completely through the abutment block 44 and a conventional grease fitting 60 is secured in the end of the bore 58 at the end opposite the rod 48. The grease fitting 60 is protectively located between the triangular gussets 46 and additional cover (not shown) can be provided over the space between the gussets to further protect the grease fitting 60. In operation, the chamber 56 is ordinarily filled with grease under pressure so as to locate the movable abutment 52 at a predetermined position along the link 48. Since the spring 28 is between the movable abutment 52 and the abutment 32 on the movable support plate 22, the movable support plate and the idler sprocket mounted thereon will be constantly biased to the right as viewed in FIG. 1 to tension the endless track 26 about the sprockets 14 and 18. If it is desired to increase the tension on the endless track 26 to take up more slack in the endless track, it is only necessary to connect a power grease gun to the grease fitting 60 and inject more grease into the chamber 56 under pressure. The grease fitting 60 is of the type which can be rotated to completely close the passage 58 to prevent the grease from being forced back through the passages outwardly of the fitting 60. When it is desired to decrease the tension on the endless track, it is only necessary to rotate the grease fitting 60 to allow the grease in the compartment 56 and the passages 54 and 58 to flow outwardly through the fitting 60 to thereby reduce the pressure in the compartment 56. Since the idler sprocket is constantly spring biased, it is capable of absorbing any shocks which might be applied to the end of the tread assembly should the end of the track assembly bump into a solid object.

In order to guide and support the endless track 26 between the sprockets 14 and 18, a plurality of guide rollers are mounted on the plate 12 in engagement with the internal surface of the endless track as shown in FIG. 1. A single guide roller 70 is shown in engagement with the upper reach of the endless track 26 between the sprockets 14 and 18 whereas a plurality of guide rollers 72 are disposed in engagement with the lower reach of the endless track between the sprockets 14 and 18. The upper guide roller is arranged to prevent the endless track from sagging downwardly between the sprockets while the guide rollers 72 provide a uniform support along the length of the endless track between the sprockets to prevent the endless track from being forced upwardly between the sprockets as the endless track vehicle passes over rough and uneven terrain.

As shown in FIG. 4, the guide roller 72 is rotatably mounted on a stub shaft 74 which is disposed in abutting engagement with the support plate 12. A support spindle 76 may be welded to the stub shaft 74 or secured thereto by threaded engagement or the like and extends through an aperture in the support plate 12. The spindle 78 is provided with a threaded end portion 78 for the reception of a nut 80 and washer 82 to clamp the shaft 74 in a cantilever position. Since the shafts 74 supporting all of the rollers 70 and 72 are located only on one side of the plate 12, it is possible to provide an endless track assembly having a reduced overall width thereby enabling the endless track vehicle to move through narrower openings.

While most of the parts illustrated and described are preferably made from steel or the like for strength, rigidity and durability, it is possible, within the scope of the present invention to utilize other materials for various components.

While the invention has been particularly shown and described with reference to preferred embodiments thereof, it will be understood by those in the art that the foregoing and other changes in form and details may be made therein without departing from the spirit and scope of the invention.

What is claimed is:

1. A tensioning device for endless track vehicles comprising a flat, elongated, vertically disposed plate adapted to be mounted on each side of a vehicle, a drive sprocket rotatably supported at one end of said plate, an idler sprocket disposed adjacent an opposite end of said plate, adjustable mounting means for said idler sprocket and an endless track entrained about said drive sprocket and said idler sprocket, said adjustable mounting means comprising a horizontally disposed slot extending inwardly from said opposite end of said plate, a support plate upon which said idler sprocket is mounted, guide means slidably mounting said support plate in said slot for movement along said slot, means for rotatably supporting said idler sprocket on said support plate, adjustable spring support means secured to one side of said plate between said drive sprocket and said idler sprocket and spring means disposed between said spring support means and said support plate for biasing said support plate towards said opposite end to move said idler sprocket away from said drive sprocket to tension said endless track, wherein said guide means is comprised of a first pair of guide plates secured to opposite sides of said support plate along a top edge thereof to define a U-shaped channel for slidably engaging said elongated plate above said slot and a second pair of guide plates secured to opposite sides of said support plate along a bottom edge thereof to define a second U-shaped channel for slidably engaging said elongated plate below said slot.

2. A tensioning device for endless track vehicles as set forth in claim 1, further comprising a plurality of guide rollers rotatably supported on said plate for engaging and supporting said endless track intermediate said sprockets wherein support means are provided for each guide roller comprising a cantilevered stub shaft secured to said plate and extending perpendicular thereto on one side thereof and means for rotatably supporting a guide roller on said stub shaft.

* * * * *